United States Patent
Kaufmann

(10) Patent No.: US 9,298,833 B1
(45) Date of Patent: Mar. 29, 2016

(54) UNFAILING SELF-CORRECTING MODIFIED BOOLEAN SEARCH ENGINE

(71) Applicant: Garry Carl Kaufmann, Port Charlotte, FL (US)

(72) Inventor: Garry Carl Kaufmann, Port Charlotte, FL (US)

(*) Notice: Subject to any disclaimer, the term of this patent is extended or adjusted under 35 U.S.C. 154(b) by 0 days.

(21) Appl. No.: 14/677,879

(22) Filed: Apr. 2, 2015

(51) Int. Cl.
G06F 7/00 (2006.01)
G06F 17/30 (2006.01)

(52) U.S. Cl.
CPC .... G06F 17/30864 (2013.01); G06F 17/30657 (2013.01)

(58) Field of Classification Search
CPC G06F 17/30; G06F 17/3069; G06F 17/30864
See application file for complete search history.

(56) References Cited

U.S. PATENT DOCUMENTS

| | | | | |
|---|---|---|---|---|
| 5,926,812 A * | 7/1999 | Hilsenrath | ........... | G06F 17/3071 707/737 |
| 9,009,131 B1 * | 4/2015 | Kaufmann | ......... | G06F 17/30864 707/706 |
| 9,110,975 B1 * | 8/2015 | Diligenti | ............ | G06F 17/30646 |
| 2014/0214883 A1 * | 7/2014 | Sanderson | ......... | G06F 17/30424 707/769 |

* cited by examiner

Primary Examiner — Azam Cheema

(57) ABSTRACT

A system, method, and computer program product for a search engine of Boolean nature wherein a multiplicity of key words are searched through a database. The results of each key word search become the database for searching with the next key word. In a normal Boolean search documents not found to contain a searched key word are immediately disposed of. In this method documents not containing the key word being searched are held until it has been determined if other documents containing the key word have been found. If so then the documents not containing the key word are disposed of; if not, all the documents of the database being searched are retained and become the database to be searched by the next word. Every key word is searched through the database resulting from the previous search. There are no search failures and results are always generated.

12 Claims, 2 Drawing Sheets

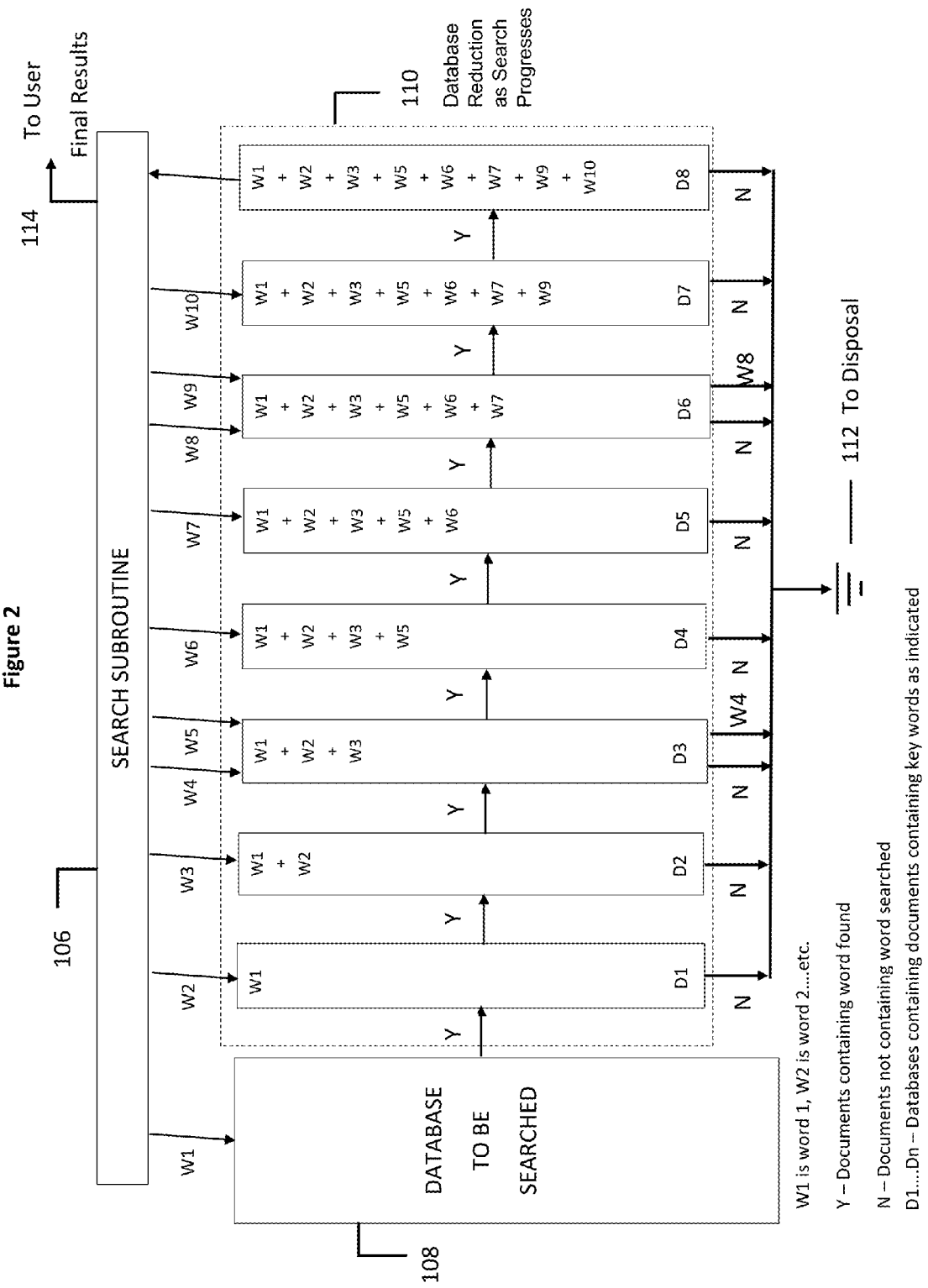

UNFAILING SELF-CORRECTING MODIFIED BOOLEAN SEARCH ENGINE

BACKGROUND OF THE INVENTION

1. Field of the Invention

The present invention generally relates to Information Retrieval, and more particularly to a method and system for finding user relevant documents using a Boolean search engine configured such that relevant results are always found.

2. Discussion of the Background

The number of documents and pages of information in every field now available through Internet searches of the World Wide Web (Web) has grown to prodigious numbers. Theoretically one can find almost anything conceivable on the Web. Practically, it has become increasingly difficult to find the precise information being sought; in part because of the volume of the information, and particularly because of the limited capabilities of current search engines. Search engine inherent limitations and proneness to inaccuracy, or failure to find what the user is searching for, is a common problem. This applies to Web searches as well as to searches in smaller intranet systems used by businesses and institutions.

The most common and familiar type of search engine is a key word driven Boolean search allowing the user to submit one or more key words. The search engine then looks for these key words within the database being searched. Boolean searches because of their very nature are very restrictive, often eliminating all documents that do not contain all the key words entered. The typical Boolean search method uses the "AND" operator, and has been described as an exact match method. It makes no distinction between documents where one of a string of key words is missing, and documents where all key words are missing. All documents not containing all the key words would be eliminated from search results. At other times no results are found because although there may be a large number of documents containing all key words to that point in the search, a particular key word is not found in the remaining documents because of poor key word selection, or because a different word was used to describe what is being sought.

If instead the "OR" operator is used in the Boolean search method and a larger number of words are employed; the number of results or hits associated with any single word or phrase is usually large and collectively would be very large. The "OR" operator expands the size of the database to be searched rather than narrowing and making the search more specific. Using both the "AND" and "OR" operators may produce results where the "AND" operator alone would give no results. However in a string of numerous key words the introduction of the "OR" operator, the results would not contain the same cohesive string of key words compared to using the "AND" operator alone. Generally it is preferable to use the "AND" operator without having to use the "OR" operator. Introduction of the "OR" operator also often renders the ranking algorithms ineffective.

A further problem of Boolean searches is that of the "precision rate" vs. the "recall rate. The precision rate being the proportion of documents in the total found which are relevant; while the recall rate is the proportion of relevant documents that were actually retrieved from the database being searched. If one desires greater precision and specificity one must narrow their search. One does this by including a greater number of key words to better define the target information. However, in doing so one will exclude more and more relevant documents when using a typical Boolean search methodology. This is because if any single word is not in a document the document is eliminated. Therefore if ten words were entered in a typical Boolean search and no documents contained all ten words, but numerous documents containing nine or eight words, the Boolean search would produce no results. No results that are close, almost, or nearly, in terms of the number of key words in a document are possible in a normal Boolean search. The nature of Boolean logic is well suited to the 0 and 1, yes or no, binary system but is incapable of dealing with finding highly probable results in a search.

Because of the exact match nature of a typical Boolean search, when no results are produced, there is no way of knowing which word or words were the cause of the failure. As a result the searcher must repeat the search possibly eliminating some words and using the "OR" operator to try to refine his search in order to produce results. This can be a lengthy and tedious process and still only produce limited results.

In addition there is the problem of synonyms. Relevant documents can easily be overlooked because the document author and the searcher use different terms to describe the same thing. Including synonyms in a Boolean search increases the chances that no results will be found since as we increase the number of words we eliminate documents not containing all words.

There also is the problem that arises due to misspelled words. Some systems can recognize misspelled words and offer corrections, but these spelling algorithms are not always effective. In addition many systems do not have the spelling correction capability. Because the word does not exist, the search is terminated with no results.

Using the "OR" operator the number of results frequently becomes difficult to manage effectively because of the volume of results, and the large number of irrelevant documents.

Often complex algorithms using proximity analysis, past user preferences, frequency analysis, and other methodologies are used to attempt to sort or rank the hits in a relevant order. These methods have proven to be inefficient since frequently many irrelevant documents accompany relevant documents. This is particularly true when the number of key words is large.

As explained earlier in a Boolean system, increasing the number of key words will enhance specificity reducing irrelevant documents; but at the same time relevant documents will be eliminated. Boolean searches commonly bring up a list of relevant and irrelevant documents with widely varying degrees of relevance. There might be an extremely relevant document in the list of documents searched but because of the use of the "AND" operator it may be excluded because one of many words is missing. In a Boolean search the only means of narrowing the search to find relevant documents is through the use of the "AND" operator. There is a need for a more effective method for a user to find all or a much larger portion of relevant documents within databases being searched.

There is a great need for a search engine that can overcome these drawbacks and provide the user with results that match more accurately the information being sought.

Accordingly, in illustrative aspects of the present invention there is provided a system, method, and computer program product for a Boolean search engine utilizing a large number of key words or phrases, configured in a manner to eliminate search termination caused by the absence of one or more key words or phrases. Searches conducted using the method and system described will always produce the optimum achievable result with the key words employed in the search.

Still other aspects, features, and advantages of the present invention are readily apparent from the following detailed description, by illustrating a number of illustrative embodiments and implementations, including a preferred mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWING

The embodiments of the present invention are illustrated by way of example, and not by way of limitation in the Figures of the accompanying drawings and in which like reference numerals refer to similar elements and in which:

FIG. 2 is an illustration of the Configuration of the Main Steps in Database Searching always producing relevant results.

DETAILED DESCRIPTION OF THE PREFERRED EMBODIMENTS

Figure 1:
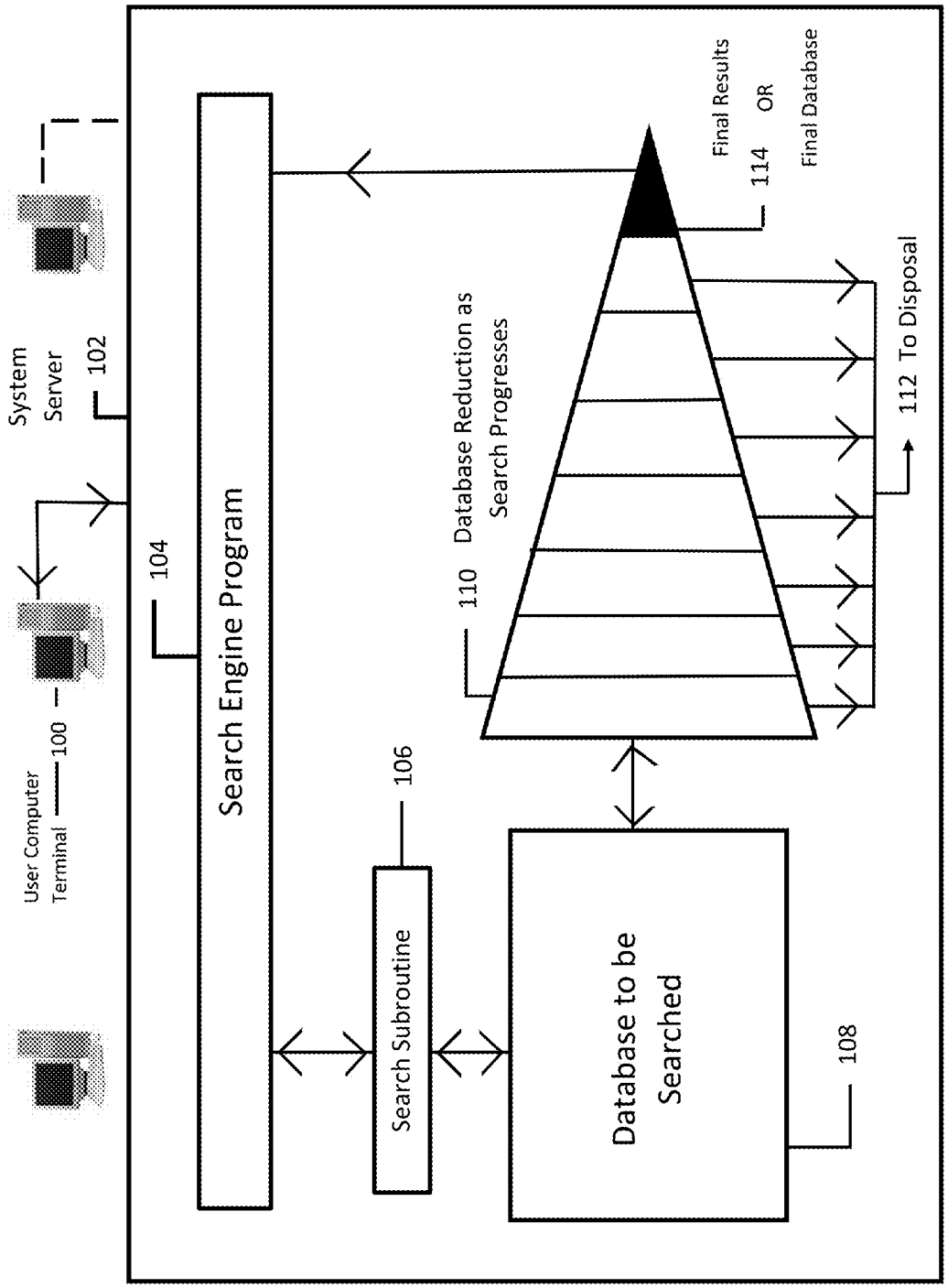
FIG. 1 is an illustration of the main systems in a Boolean Search Engine.

Referring now to the drawings, wherein like reference numerals designate identical or corresponding parts throughout the several views, and more particularly to FIG. 1 thereof, which shows an illustrative Main Systems of a Boolean Search Engine. In FIG. 1

A User at a computer terminal 100 enters a multiplicity of key words, or phrases in quotation marks, into a key word list box on the computer and sends them to the System Server 102. The server of conventional design, well-known in the art of computers includes a memory and processor (neither of which is shown in the drawings), all coupled in a conventional and well-known manner. The server 102 receives the key words of a requested search query and sends them to the Search Engine Program 104, which conducts the search. The Search Engine Program 104, a collection of software, acts as an intermediary between the search subroutine 106, and the hardware components, to ensure a smooth continuous and rapid search. The hardware and software components, and their interaction to accomplish a completed search will now be described.

FIG. 2 shows that the Search Subroutine 106 under the direction of the Search Engine Program 104 (shown in FIG. 1) directs the multi word query beginning with the first key word W1 being searched through the Database to be Searched 108. This database would be the entire database of interest in an institutional setting or possibly the World Wide Web database, all of which are word based. The initial search should result in a number of hits or documents that will contain that key word or phrase. This collection of documents associated with this first key word now has greater relevancy than most documents in the Initial Database 108, since most will not contain that word. As shown in FIG. 2 we represent these documents as D1 or Database 1, all containing key word W1. Documents not containing the key word W1 are discarded.

In the next step the Search Subroutine 106 enters the next key word W2 searching it through the documents in D1; eliminating documents not containing that word and retaining all documents containing W2. These documents now contain W1 and W2 and become database D2. This process continues on until all key words have been searched through a succession of databases containing an ever-decreasing number of documents since documents not containing that word are eliminated. Up to this point the search process is a normal Boolean search.

We will now demonstrate the difference between our search method and the normal Boolean search method by looking at D3 in FIG. 2. As can be seen, D3 contains documents all of which contain key words W1, W2, and W3 and key word W4 is searched through these documents. Assuming that W4 does not occur in any of these documents, what would occur in a normal Boolean is as follows:

As W4 is searched through these documents they are being progressively discarded because they do not contain that word. At the conclusion of this search all documents have been discarded and as a result there are no documents available for further searching. There also are no results. The search has failed. Such a failure could occur anywhere along the search process. For example, in conducting a 10 word search, when the ninth word, or W9, was searched through documents already containing the previous 8 key words and none contained the ninth word, the search would again give no results. We will have discarded documents that are probably quite relevant for the sake of one missing word (assuming W10 would not also cause a failure). Up to this point the user has spent time selecting key words that he believes will properly identify his objective and result in meaningful documents. In addition the search has resulted in documents containing a relatively large number of key words. One would expect these documents to probably be quite relevant. Despite this, because of one missing word the search is terminated with no results. This is a consequence of the Boolean search method. This seems like throwing out the baby or the good documents, with the bath water or one failed word. This is an entirely unsatisfactory outcome, and entirely avoidable.

By contrast we will use a modified Boolean method and system that will not discard and eliminate relevant documents from further search with additional key words, and ensure a successful search completion with all found relevant key words, as follows:

When any database including the initial database is searched using a key word, each document will be assigned either a 0 or a 1 indicating the presence or absence of that key word. Let us assume that the 0 indicates that the document does not contain the key word being searched, and the 1 indicates that the document contains that key word. No documents are eliminated until the key word being searched, has been searched through all documents in the database being searched. 0's and 1's will have been assigned to each document. Upon completion of the search of the database the subroutine determines if there are documents in that database containing the key word being searched. If there are documents containing the key word being searched, these become the database to be searched with the next key word and the remaining documents not containing that key word are discarded or deleted.

If it should happen that the key word being searched is not found in any document in the database being searched, which would cause a search failure in a normal Boolean search; the search subroutine will instruct that these documents be retained and act as the database for the search with the next key word. The key word that found no relevant documents would be bypassed. It would seem more sensible to bypass this single keyword, which has proven to be without merit, and retain documents that have established some degree of relevancy by virtue of containing some key words. This is illustrated in FIG. 2. Looking at D3 that is a database that contains documents all containing key words W1, W2, and W3 and having W4 being searched through these documents. As the search progresses with 0's and 1's being assigned to each document and no documents discarded; we find that no documents contain W4, having all documents assigned a 0 indicating the absence of that key word. As described earlier D3 is still intact, containing all its original documents and all are retained, but W4 is bypassed and W5 is searched through D3. As shown this generates documents that contain W1, W2, W3, and W5 which become D4, and are searched with W6. The process then continues to the next word and so on. As can be seen in FIG. 2 word 8 or W8 was not found in D6 and so bypassed with the D6 database then being searched with W9. The final outcome in D8 shows that the final results will contain all 10 words with the exception of W4 and W8. These of course were not in any documents and therefore bypassed. In the event that when the final key word is searched through the final database and no documents containing that word are found the final database will act as the final results to be sent to the user. Thus we have completed a modified Boolean search using only the AND operator that would have failed if conducted in normal Boolean fashion. This is not to say that other Boolean operators would not be beneficial. The final search results would be ranked using conventional ranking algorithms prior to presenting them to the user.

There may be circumstances in connection with synonyms that where the use of the "OR" operator may be beneficial. Applying the "OR" operator when using a synonym of a key word will bring in additional documents but only those that already contain the preceding key words already searched and found to contain all those key words. Failure to find any synonym would not jeopardize the search or the results. Overall the search should be enhanced for relevancy.

The normal Boolean search method is very simple, very fast, well adapted to the 0 and 1 logic of computer programs, but has many drawbacks as earlier described. By modifying the search method as described we eliminate these shortcomings with virtually no offsetting drawbacks. The modifications to an existing normal Boolean search system needed to accomplish the method and system described are easily implemented. The benefits are considerable.

Clearly, using the method and system described has major advantages over a normal Boolean search; the advantages being:

(1) Searches will no longer fail because one or more key words are not found as long as some words are found.
(2) A large number of key words can be entered into a search helping to better define what is being searched for without fearing search failure. The time required for a searcher to accomplish a successful search should be significantly reduced because a larger number of key words can be used without fear of failure.
(3) The concern over synonyms is eliminated.
(4) One or more poor word selections by a user will not jeopardize the search process.
(5) Misspelled words would be discarded and bypassed and not terminate the search with no results.

It should also be pointed out that the computational requirements for this type of search are very similar to those of a normal Boolean search. This means that this method and process can very easily be adapted to searching the largest databases with a large number of users utilizing the system simultaneously.

Other embodiments could provide additional advantages and benefits. For example the search subroutine could note any key word that was deleted because it failed to find documents in a database. Providing these words to the user at the conclusion of the search would be helpful if one desired to further extend the search. This could occur if either the number of key words used failed to find meaningful documents, or the number of documents found when the search was concluded was large and unmanageable. It would then seem appropriate to conduct a further search using additional key words along with those that have already proven to be successful. Previously unsuccessful words would be avoided.

In a further embodiment it may be advantageous to not only bypass key words as described earlier but to also bypass them if only a very small number of documents containing them were found. If for example in a 10 key word search as shown in FIG. 2 at the conclusion of searching W4 through D3 we only found 5 documents containing W4 it may be advisable to bypass W4 and retain D3 having documents all containing W1, W2, and W3. This is because we will only have 5 documents going forward to be searched with an additional 6 key words and the maximum number of possible documents at the conclusion of the search will be 5.

It may be more reasonable to bypass W4, retaining all the documents of D3 and going on to the next word. This is particularly true for the early part of the search process. Near the end of the process when a large number of key words are found in all the documents of a database; and the number of documents in that database are smaller, this procedure might not be advisable. It may be more advisable to pre-program the search subroutine to restrict this approach to the first half of key words being searched, or to have a sliding scale of the number of minimum documents desired as the search progresses. This number would become smaller as the number of words searched through the succession of databases increased. As an example of this, preprogramming could require that at least 10 documents containing the word being searched, to be found for the search to continue with the next word to be searched through those 10 or greater documents. If the number of documents containing the word being searched is fewer than 10, the entire database being searched is retained for search by the next word. Thus no documents are discarded from the search process unless at least 10 documents containing the word being searched are found.

A further embodiment could employ a different method of sorting documents that contain, and those not containing the key word being searched, and subsequently, either disposing of the documents, or retaining them for continued key word searching. In this embodiment during any key word search of any database, documents not containing the key word would be sent to a hardware storage unit for temporary document storage. From here forward we will refer to this storage unit as a recycle bin. It would not be necessary to assign 0's or 1's to documents to distinguish those containing and not containing key words. Documents not containing the key word being searched would be temporarily sent to the recycle bin. If key word containing documents were found in the database being searched, all documents in the recycle bin would be deleted, and the documents containing the key word being searched would become the database to be searched with the next key word. If no documents were found containing the key word being searched, all the documents in the recycle bin would be retained and returned, to reconstitute the original database and be searched with the next key word.

In a normal Boolean search the order of entry of key words does not influence the final results in terms of documents found. This is because all the key words must appear in all the found documents.

Since the entry of each key word as the first word will result in a different collection of documents, the failure of any subsequent key word within this document collection will vary. This of course will have an influence on the final resulting documents. Therefore yet another embodiment might enter each key word first followed by the remaining key words. This would result in a somewhat different collection of final documents. One might want to limit such a search of successive key words to only those words considered most relevant.

The above-described devices and subsystems of the illustrative embodiments can include, for example, any suitable servers, workstations, PCs, laptop computers, PDAs, Internet appliances, handheld devices, cellular telephones, wireless devices, other devices, and the like, capable of performing the processes of the illustrative embodiments. The devices and subsystems of the illustrative embodiments can communicate with each other using any suitable protocol and can be implemented using one or more programmed computer systems or devices.

One or more interface mechanisms can be used with the illustrative embodiments, including, for example, Internet access, telecommunications in any suitable form (e.g., voice, modem, and the like), wireless communications media, and the like. For example, employed communications networks or links can include one or more wireless communications networks, cellular communications networks, G3 communications networks, Public Switched Telephone Network (PSTNs), Packet Data Networks (PDNs), the Internet, intranets, a combination thereof, and the like.

It is to be understood that the devices and subsystems of the illustrative embodiments are for illustrative purposes, as many variations of the specific hardware used to implement the illustrative embodiments are possible, as will be appreciated by those skilled in the relevant art(s). For example, the functionality of one or more of the devices and subsystems of the illustrative embodiments can be implemented via one or more programmed computer systems or devices To implement such variations as well as other variations, a single computer system can be programmed to perform the special purpose functions of one or more of the devices and subsystems of the illustrative embodiments. On the other hand, two or more programmed computer systems or devices can be substituted for any one of the devices and subsystems of the illustrative embodiments. Accordingly, principles and advantages of distributed processing, such as redundancy, replication, and the like, also can be implemented, as desired, to increase the robustness and performance of the devices and subsystems of the illustrative embodiments.

The devices and subsystems of the illustrative embodiments can store information relating to various processes described herein. This information can be stored in one or more memories, such as a hard disk, optical disk, magneto-optical disk, RAM, and the like, of the devices and subsystems of the illustrative embodiments. One or more databases of the devices and subsystems of the illustrative embodiments can store the information used to implement the illustrative embodiments of the present inventions. The databases can be organized using data structures (e.g., records, tables, arrays, fields, graphs, trees, lists, and the like) included in one or more memories or storage devices listed herein. The processes described with respect to the illustrative embodiments can include appropriate data structures for storing data collected or generated by the processes of the devices and subsystems of the illustrative embodiments in one or more databases thereof.

All or a portion of the devices and subsystems of the illustrative embodiments can be conveniently implemented using one or more general purpose computer systems, microprocessors, digital signal processors, micro-controllers, and the like, programmed according to the teachings of the illustrative embodiments of the present inventions, as will be appreciated by those skilled in the computer and software arts. Appropriate software can be readily prepared by programmers of ordinary skill based on the teachings of the illustrative embodiments, as will be appreciated by those skilled in the software art. Further, the devices and subsystems of the illustrative embodiments can be implemented on the World Wide Web. In addition, the devices and subsystems of the illustrative embodiments can be implemented by the preparation of application-specific integrated circuits or by interconnecting an appropriate network of conventional component circuits, as will be appreciated by those skilled in the electrical art(s). Thus, the illustrative embodiments are not limited to any specific combination of hardware circuitry or software.

Stored on any one or on a combination of computer readable media, the illustrative embodiments of the present invention can include software for controlling the devices and subsystems of the illustrative embodiments, for driving the devices and subsystems of the illustrative embodiments, for enabling the devices and subsystems of the illustrative embodiments to interact with a human user, and the like. Such software can include, but is not limited to, device drivers, firmware, operating systems, development tools, applications software, and the like. Such computer readable media further can include the computer program product of an embodiment of the present inventions for performing all or a portion (if processing is distributed) of the processing performed in implementing the inventions. Computer code devices of the illustrative embodiments of the present inventions can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the illustrative embodiments of the present inventions can be distributed for better performance, reliability, cost, and the like.

As stated above, the devices and subsystems of the illustrative embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

| TABLE OF REFERENCE NUMBERS | |
|---|---|
| Reference Number | Name of Component |
| 100 | User Computer Terminal |
| 102 | System Server |
| 104 | Search Engine Program |
| 106 | Search Subroutine |
| 108 | Initial Database to be Searched |
| 110 | Database Reduction as Search Progresses |

While the present invention has been described in connection with a number of illustrative embodiments, and implementations, the present invention is not so limited, but rather covers various modifications, and equivalent arrangements, which fall within the purview of the appended claim

What is claimed is:

1. In a computer network system an improved computer implemented method running on a server of said network system for performing document searches comprising the steps of:
   (a) Initiating a search in response to a user's query from an input device, said query including a multiplicity of key words, with said key words being searched one at a time through a word indexed database;
   (b) noting which documents in said word indexed database contain a first key word of said key words being searched and which documents do not contain said first key word;
   (c) eliminating all documents not containing said first key word only if any other documents containing said first key word are found, and;
   (d) retaining documents containing said first key word and making these documents the database to be searched with, a next of said key words, or alternately;
   (e) retaining all documents not containing said first key word if no documents containing said first key word were found, and making these documents the database to be searched with a next of said key words, and;
   (f) repeating steps (b) through (e) with a next of said key words in lieu of a first of said key words for each of the remaining said key words of said query, and;
   (g) sending the resulting documents back to the user, whereby; a modified Boolean search method will have been created that will search all input key words through said word indexed database, without terminating the search because one or more of said key words being searched is not found in the database being searched, and will always generate relevant documents.

2. The method of claim 1 further including in response to preprogramming, the step of retaining all documents in the database being searched if a specified number of documents containing the key word being searched are not found, and using these retained documents as the database for a next of said key words to be searched.

3. The method of claim 1 further including in response to preprogramming, providing to the user a list of any said key words that failed to find any documents during the search process as well as a list of any said key words that successfully found documents during the search process.

4. The method of claim 1 further including in response to preprogramming, sending documents found not to contain the key word being searched in any database to a recycle bin and disposed of, if any documents containing the key word are found; or if no key word containing documents are found in that database, returning all recycle bin documents to reconstitute the original database for searching with a next key word.

5. A system comprising of;
A server connected to a network, the server including; at least one processor, and a memory operatively coupled to said at least one processor, the memory storing program instructions that when executed by the at least one processor, causes the at least one processor to:
   (a) initiate a multi key word search of a word indexed database by searching a first key word through said word indexed database;
   (b) note which documents in said word indexed database contain said first key word and which documents do not contain said first key word
   (c) eliminate all documents not containing said first key word only if any other documents containing said first key word are found;
   (d) retain documents containing said first key word and make these documents the database to be searched with a next of said multi key word, or alternately;
   (e) retain all documents in said word indexed database to become the database to be searched with a next key word, if no documents containing said first key word are found; and;
   (f) repeat steps (b) through (e) with a next key word in lieu of a key word for each of the remaining said multi key word, and;
   (g) send the resulting documents back to a user, whereby a modified Boolean search system has been created, that will search said word indexed database without terminating the search because one or more key words being searched fails to appear in any of the word indexed database documents being searched, and will always generate relevant documents.

6. The system of claim 5 further including in response to preprogramming, the step of retaining all documents in the word indexed database being searched if a specified number of documents containing a key word being searched are not found, and using these retained documents as the database for a next key word search.

7. The system of claim 5 further in response to preprogramming providing to the user a list of any key words that failed to find documents during the search process, as well as a list of any key words that were successful in finding documents during the search process.

8. The system of claim 5 further including in response to preprogramming, sending documents found not to contain any key word being searched in any database, to a recycle bin and disposed of, if documents containing any key word being searched are found; or if no key word containing documents are found in the database being searched; returning all recycle bin documents to reconstitute the original database for searching with a next key word.

9. A non-transitory computer readable storage medium, comprising; a plurality of computer-executable instructions, which when executed by a computer, cause the computer to:
   (a) in response to a user's multiple key word query, initiate a search of a word indexed database, said word indexed database being searched one key word at a time;
   (b) note which documents in said word indexed database contain a first key word of said multiple key word query, and which documents do not contain said first key word;
   (c) eliminate all documents not containing said first key word, only if any other documents were found containing said first key word being searched;
   (d) retain all documents containing said first key word and make these documents the database to be searched with a next key word, or alternately;

(e) retain all the documents in said word indexed database if no documents contained a first key word being searched, and make these documents the database to be searched with a next of said multiple key word, and;

(f) repeat steps (b) through (e) with a next key word in lieu of a first key word for each of the remaining key words of said query, and;

(g) send the resulting documents back to the user, whereby a modified computer program product has been created, that will search said word indexed database, without terminating the search because one or more of said multiple key word being searched fails to appear in any of the word indexed database documents being searched, and will always generate relevant documents.

10. The non-transitory computer readable storage medium of claim 9, further including in response to preprogramming the step of retaining all documents in the database being searched if a specified number of documents containing a key word being searched are not found, and using these documents as the database for a next key word search.

11. The non-transitory computer readable storage medium of claim 9, further in response to preprogramming providing the user a list of any key words that failed to find any documents during the search process, as well as a list of any key words that were successful in finding documents containing a key word.

12. The non-transitory computer readable storage medium of claim 9 further including in response to preprogramming, sending documents found not to contain a key word being searched in any database, to a recycle bin and disposed of, if documents containing a key word being searched are found; or if no documents containing a key word being searched are found in that database, returning all recycle bin documents to reconstitute the original database for searching with a next key word.

* * * * *